United States Patent [19]

Beyer et al.

[11] Patent Number: 4,912,297
[45] Date of Patent: Mar. 27, 1990

[54] DEVICE FOR AND METHOD OF ESTABLISHING JOINTS BY MEANS OF LASER BEAMS

[75] Inventors: Eckhard Beyer; Klaus Behler, both of Aachen; Klaus-Otto Welsing, Menden, all of Fed. Rep. of Germany

[73] Assignees: Fraunhofer-Gesellschaft zur Förderung der angewandten Forschung e.V., Munich; Hoesch AG, Dortmund, both of Fed. Rep. of Germany

[21] Appl. No.: 300,067
[22] PCT Filed: Apr. 20, 1988
[86] PCT No.: PCT/DE88/00239
§ 371 Date: Jan. 12, 1989
§ 102(e) Date: Jan. 12, 1989
[87] PCT Pub. No.: WO88/08353
PCT Pub. Date: Nov. 3, 1988

[30] Foreign Application Priority Data

Apr. 25, 1987 [DE] Fed. Rep. of Germany ....... 3713975

[51] Int. Cl.⁴ ..................... B23K 26/00; B23K 26/06
[52] U.S. Cl. ........................ 219/121.63; 219/121.74
[58] Field of Search ............ 219/121.63, 121.64, 219/121.73, 121.74

[56] References Cited

U.S. PATENT DOCUMENTS 4,645,256 3/1987 Minamida et al. ............. 219/121.64

OTHER PUBLICATIONS

C. M. Banas, Laser Materials Processing, Proceedings of the 5th International Congress on Applications of Laser and Electro-Optics Nov. 10–13, 1986, pp. 97–104.

Primary Examiner—C. L. Albritton
Attorney, Agent, or Firm—Max Fogiel

[57] ABSTRACT

In a device for joining by means of laser radiation, in particular for welding edges, the laser beam travels essentially parallel to the plane of the joint gap and is directed essentially perpendicular to the joint line. To ensure that the energy of the laser radiation is absorbed almost entirely in the region of the joint, the laser radiation is polarized mainly parallel to the plane of the joint gap and/or the laser beam (20) is shaped or focused at right angles to the joint gap (12) in the form of a strip parallel to said gap.

24 Claims, 11 Drawing Sheets

DEVICE FOR AND METHOD OF ESTABLISHING JOINTS BY MEANS OF LASER BEAMS

The invention concerns a device for establishing joints by means of laser beams, especially for welding edges, wherein the beam extends essentially parallel to the plane of the joint and perpendicular to the line of the joint.

A device of this type is known from U.S. Pat. No. 4,471,204. Two edges are positioned together to create a tapering gap. The laser beam is directed toward the gap in such a way that it will be reflected into the gap from the surfaces of the facing edges. Most of the radiation energy is absorbed in this process and accordingly does not penetrate deep enough into the tapering gap. Compression rollers are accordingly necessary to force the molten surfaces together and establish the joint. The compression leaves molten material on both sides of the gap. The drawbacks to this type of welded seam include for example its lack of uniformity and a potential for pores.

One object of the invention is to improve a device of the type initially described to the extent that the energy will be absorbed nearer the joint.

This object is attained in accordance with the invention by an improvement wherein the laser beam is polarized preponderantly parallel to the plant of the joint gap.

It is significant to the invention that the laser beam is linearly polarized parallel to the plane of the joint, meaning that no circularly polarized radiation is employed. The result is that the beam will be optimally reflected from the surfaces that are to be joined, with minimal energy being absorbed, that is. It is practically only at the joint itself that absorption is sufficient to melt the material. It is unnecessary to exert any essential transverse pressure to adequately weld the surfaces that are to be bonded together. The result will be optimal when the laser beam is polarized strictly parallel to the plane of the joint.

It is practical for the laser beam to be constructed or focused across the gap in the form of streaks that parallel the gap. The first point of reflection will accordingly be as deep inside the gap as possible and in the vicinity of the point of junction. Shaping the beam in this way will also help the beam impact in the form of a streak, maintaining the angle of the incidence as wide as possible and hence the reflection of the laser beam, which is polarized parallel to the plane of the gap as high as possible and free of absorption. The beam is shaped by focusing or, without focusing, by adjusting the cross-section of the beam to be geometry of the joint, by reducing the cross-section for example. The beam is shaped or focused by systems of mutually adapted mirrors or lenses, especially cylindrical, parabolic, or paraboloid.

The laser beam is, at the point of junction, slightly larger or smaller than the depth of the gap. If the laser beam is larger than the depth of the gap, the excess component of the beam will strike behind the point of junction at the edges of the upper and lower surface that are to be bonded. These areas will be in accordance with the entering energy be melted and evened out, improving the weld at this in itself critical region. Furthermore, the particular direction of beam polarization employed will result in optimal energy input at the upper and lower surfaces at the edges of the strip. If the laser beam is smaller than the depth of the gap, it will be possible to irradiate only a certain portion of the depth. It will accordingly be possible for example to join together two laminations in the two parts of the joint that are adjacent and at the same depth, with the beam having no effect on laminations above or below the laminations being bonded. The higher and lower laminations can then if necessary be joined together by another beam or by other means.

When the laser beam encloses the mean perpendicular to the line of the joint, the point of junction on both sides of the gap will be improved in the aforesaid sense when the beam is slightly larger than the depth of the gap.

The point of junction can additionally be heated from one or both sides of the gap with one or more laser beams or other sources of heat. The result is improved homogeneity of the point of junction in the vicinity of its edges as well as more rapid welding. When coated parts are bonded together, the outer laminations can be bonded by the additional laser beams or other sources of heat.

One embodiment of the invention has a measuring instrument that constantly monitors the temperature of the preliminarily positioned-together parts at the point of junction and/or in its vicinity and also has if necessary controls that compare the results of the temperature measurement with a reference temperature and accordingly regulate one or more operating parameters in the joining device. Constant monitoring is particularly necessary when the parts being bonded together are constantly and incrementally advanced in the form of strips or webs, whereby it is practical to advance them at a rate such that the point of junction remains at a constant distance away from the laser or from the optical system that focuses its beam. This can be attained automatically if the results from the measuring instrument are constantly processed and used to control an operation parameter in the joining device, the rate at which the parts are advanced for example. The measuring instrument can on the other hand also be employed independently to monitor temperature. The measuring instrument can be aimed at any point in the vicinity of the point of junction, at the vicinity of the abutting edges of the parts being bonded together or upstream or downstream of the point of junction for example. The temperature is preferably measured at the surface of the seam on one or both sides of the gap. It is also especially important to monitor the temperature at the point of junction itself in order to determine whether the temperature is above the melting point. The results of this measurement or of a measurement in the vicinity of the point of junction can be exploited to control the laser or its beam in the capacity of operating parameters in the joining device. The monitoring can relate for example to the emitted heat, pyrometrically in other words.

The laser beam can be shaped in the form of a point or a streak over a fraction of the depth of the gap and repeatedly deflected over some of that depth. This deflection or scanning of the beam is in itself known and can be especially practical when the distribution of energy in a beam oriented at the depth of the gap is too irregular, especially when the energy density is too low at the edges of the beam, so that the aforementioned edge area is insufficiently or non-uniformly heated. Sweeping a point-shaped or elliptically shaped or focused beam can also help make the energy distribution over the depth of the gap and at the edges of the point of junction adjacent to the gap more uniform. It will be necessary for the laser beam to execute a sweeping motion when the point of junction is very long, when, that is, generating the beam is difficult due to the great width of the parts being bonded together. Scanning part of the depth of the gap will be practical when laminated materials are being welded and only one lamination of the parts being bonded together is to be welded by a particular beam.

The bonding surfaces of the parts being bonded together are positioned essentially free of vertical and/or lateral setbacks at the point of junction and if necessary behind it in the vicinity of the welding seam. It is practical to keep the setback less than 0.1 mm. This is an advantage in relation to obtaining a precise seam and eliminates for example the need for subsequent processing of the seam. Any stress that occurs is also counteracted and the potential for cracks avoided. It is possible in a practical way to position the parts being bonded together without setbacks in this way while they are being welded if guides are present on on each side of the gap between the parts being bonded together in the vicinity of the welding seam, said guides acting not only on the welding seam but also on the parts being bonded together. The design of the guides will also depend on the geometry of the joint. The guide can for example be a roller with an annular groove that is at least as wide as the welding seam or an annular collar that is no thicker than the parts being bonded together. The annular groove leaves the vicinity of the seam free, so that any molten material that emerges will not affect the position of parts being butt-welded together. The annular groove can also be designed to allow measurement of process-relevant parameters, especially the temperature at the point of junction, whereby at least one guide component will leave space free next to or above the seam, so that the process can be monitored from outside. The annular collar that is as thick as the parts being bonded together allows the parts to remain practically unsubjected to force when an overlapping joint is welded.

It is practical for the bonding surfaces of the parts being bonded together to be rendered smooth, by milling, grinding, or polishing for example, at least in relation to irregularities that might deflect the beam, to prevent the polarized beam from being absorbed or scattered even in front of the line of the joint of the edges. It is practical to reduce roughness to less than 100 μm.

At least one of the parts being bonded together has at least two layers of different materials. One or more of the parts can be galvanized or electroplated, sprayed, lacquered, or coated with plastic.

To prevent radiation losses, the laser beam is focused with focal points in the vicinity of the point of junction. Since the beam is accordingly adapted to the geometry of the joint, the number of reflections in front of the point of junction is kept low. This measure will also prevent the beam from reflecting out excessively in front of the point of junction.

A laser beam with a streak-shaped cross-section is positioned at an angle to the plane of the gap, so that both of the parts being bonded together will be covered by the beam and their reflectivity can be exploited even at slight errors in the adjustment of the beam-control system.

Another object of the invention is to improve a method of the type originally described to the extent that the energy will be absorbed nearer the joint.

This object is attained in accordnace with the invention by an improvement wherein the laser beam is polarized preponderantly parallel to the plane of a gap between two parts being bonded together. The advantages described with reference to the device in accordance with the invention will be attained by the method as well.

This method is practical in that the joining is carried out without plasma, resulting in a secure bond, unaffected by plasma processes, between the parts. The joining can be carried out at high advance rates.

The parts being bonded together can in a practical way be preliminarily and/or subsequently heated in the vicinity of the point of junction, whereby the heat can be applied in the same way or differently on both sides of the seam, depending on the bonding conditions. The preliminary or subsequent heating is carried out to obtain a complete, uniform, and low-stress seam and to simultaneously increase the welding rate. The preliminary or subsequent heating can also have an effect on the metallurgical properties in such a way as to allow or at least facilitate a bond. The parts will be heated differently in particular for example when they are made out of different materials with different heat conductivities. The differential heating of the parts can be controlled to obtain identical or sufficiently associated temperatures. The heating is carried out with circular if necessary polarized laser beams, with high-frequency radiation, etc. The subsequent heating can also be carried out with the processing beam when it extends farther into the plane of the gap than the gap is deep.

At least the preliminarily and/or subsequently heated parts are flooded with a protective gas, especially if the natural atmosphere could affect the bond between the parts, due for example to oxidation of the parts before or after they have been bonded.

The laser beam is pulsed and, when the shape of the spot covered by the beam diverges from a circle, the output of pulses is increased to at least partly compensate for the loss of intensity.

The edge of one of the parts being bonded together is sheared in a motion that has a vertical component against the edge of another of the parts being bonded together into a butt joint during one increment of the advance when the parts are to be butt-welded and cannot be positioned edge-to-edge in a single plane, because they would be impermissibly deformed. This is the case with all massive parts and with those that have large cross-sections as well as with those that are relatively wide in comparison to their thickness, such as for example, sheets, strips, and slabs. The butt joint will in that case be for simplicity's sake a rectangular or so-called "I" joint. When the parts are sheared together, however, the surface of the parts that constitute the point of junction may not arrive in a position in which one of the surfaces can reflect the impacting beam onto the opposing surface until just in front of the line of the joint. This is especially true when the parts are flat in relation to their width, as with the aforesaid sheets, strips, and slabs. In one such case, which can also for example occur during the welding of coils of tubing, the surfaces of the parts being bonded together that constitute the point of junction are oriented at an angle that is not 90° to one outer workpiece surface of the parts. It is only the design of the parts with a butt that slopes or overlaps at an angle that allows the laser beam entering the bonding gap to be reflected to the desired extent and facilitates the welding of coils of tubing and of vessels etc. by means of lasers to the desired extent.

At least two parts in the form of laminar materials can be joined together at their major surfaces. This embodiment can also be employed for plating, and coatings or foils can be applied to a base, especially in conjunction with a repeatedly deflected point-shaped or streak-shaped laser beam.

At least one of the parts being bonded together can have at least two laminations made out of different materials. When two parts of this type are bonded together, laminations of different material can be bonded together only at their boundaries, without, that is, fusing the materials over the total thickness of the lamination. Any coatings will accordingly be undamaged.

It is also simultaneously possible for only one or only a limited number of the laminations in the coated part to be bonded to the other part.

One embodiment of the invention will now be described with reference to the drawing.

FIG. 10, and FIGS. 12a through 12e are schematic representations of rollers for positioning parts being bonded together.

Two edges 10 and 11 are to be welded together. The edges constitute a right-angled butt joint. It is, however, also possible to weld a butt seam, a beaded seam, or an overlapping seam. Surfaces larger than edges can also be welded together. It is also possible to plate sheets, foil, structural components, etc. It is possible to bond a number of laminations together to produce sandwiched composites. Plated sheets can also be welded together without the plating fusing with the base in the vicinity of the seam.

Edges 10 and 11 are for example regions of such separate parts as sheets, foil, etc. or the edges of a single strip of material that has been rolled into an open-seam tube, coil of tubing, or similar structure. Between edges 10 and 11 is a gap 12 that is retained in the same position in order to advance the material in the direction indicated by arrow 13. Edges 10 and 11 will accordingly increasingly approach each other as the material or the parts advance in the direction indicated by arrow 13, as will also be evident from FIG. 2b, resulting in a point 14 of junction, from which a welding seam 15 extends, in the vicinity of which the surfaces 16 and 17 of edges 10 and 11 that are to be bonded together become welded together as the material that the edges are made out of melts. Surfaces 16 and 17 are brought together by applying pressure to edges 10 and 11 in the vicinity of the point 14 of junction. In the vicinity of the point 14 of junction itself, surfaces 16 and 17 rest against each other practically without pressure, so that the molten material is practically not subject to joining pressure.

Figure 1:
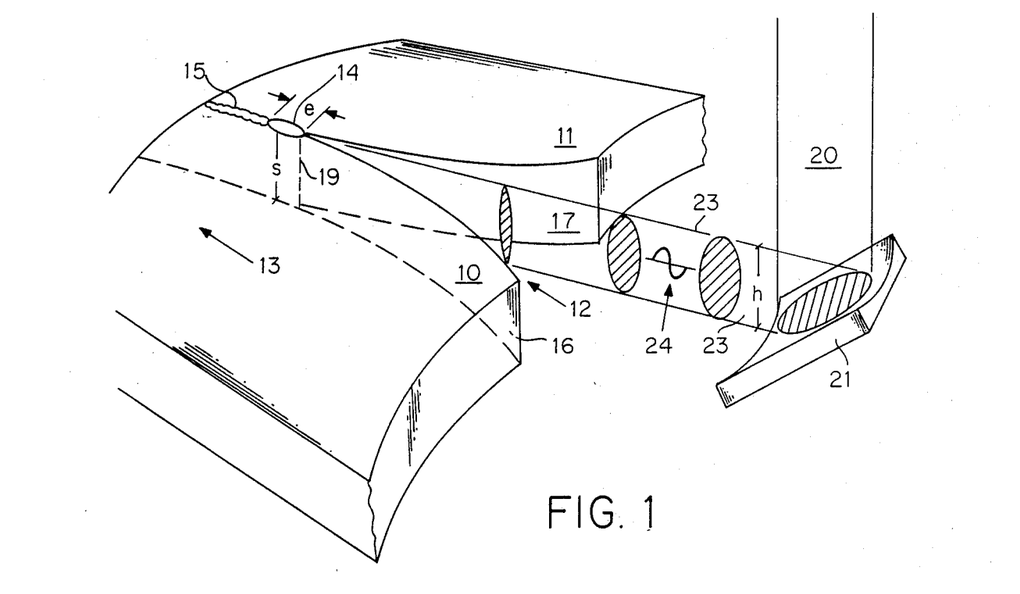
FIG. 1 is a perspective view of the device in accordance with the invention.

FIG. 1 illustrates in the vicinity of the point 14 of junction a line 19, against which surfaces 16 and 17 initially rest along the depth s of gap 12. The point 14 of junction also has a dimension e in the direction indicated by arrow 13. A laser beam 20 heats the point 14 of junction in an appropriate way.

The cross-section of the beam is shaped and the beam is focused to dimensions appropriate for the joining process by means of a series of cylindrical, parabolic, or paraboloid mirrors. The shape and radii of curvature or focal width of the mirrors are interrelated to shape and focus laser beam 20 as desired.

Figure 2A:
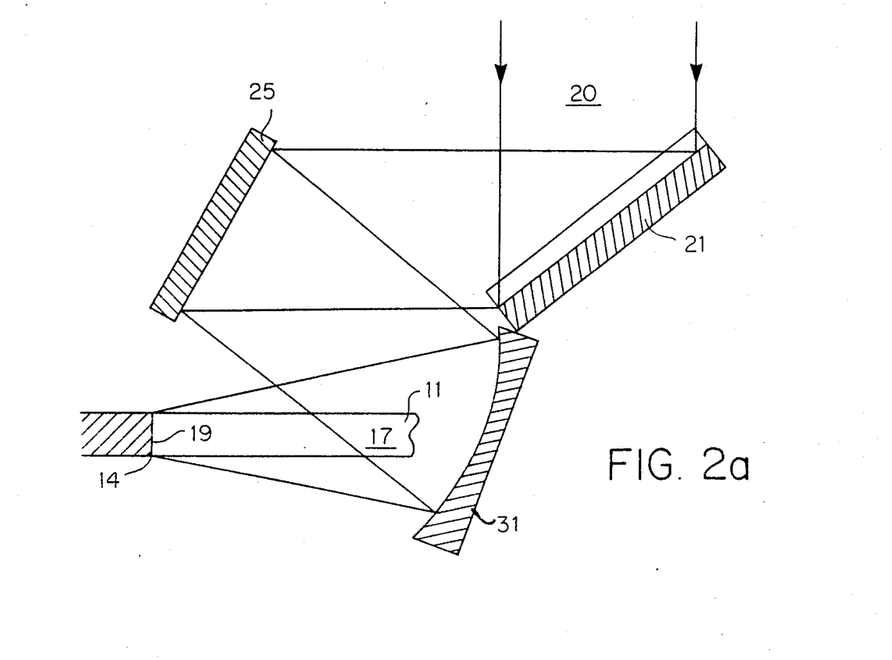
FIGS. 2a and 2b are a section through the plane of the gap and a schematic view of another device in accordance with the invention.
Figure 2B:
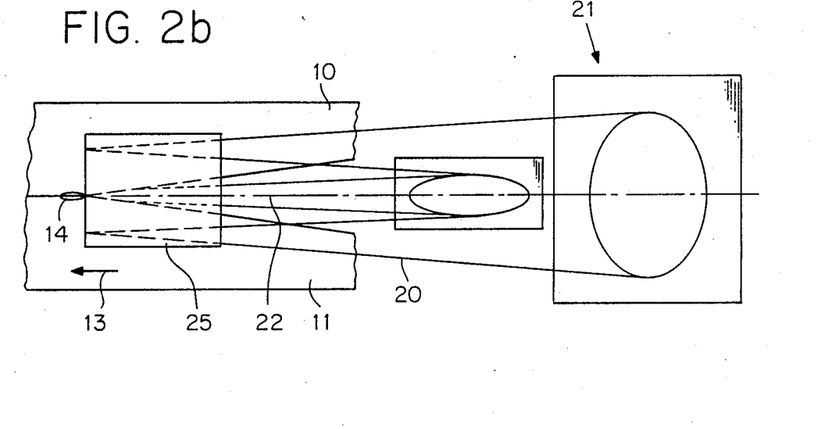

Laser beam 20 is generated for example by a $CO_2$ laser and projected onto a focusing mirror 21, which deflects it to the point 14 of junction. Focusing mirror 21 is positioned as illustrated in FIG. 1 and FIGS. 2a and 2b such that laser beam 20 extends inside the plane 22 of the gap. These two measures ensure that the beam will penetrate as deep and uniformly as possible into gap 12.

Laser beam 20 must be focused to ensure that its energy is if at all possible available only in the vicinity of the point 14 of junction. FIG. 1 accordingly illustrates a laser beam 20 that has a level h matching the depth s of gap 12 and that is focused as powerfully as possible across gap 12 by focusing mirror 21. FIG. 1 illustrates by means of three ellipses that become narrower along the direction of the beam at a constant beam level h how streaks that parallel the gap can be focused. Laser beam 20 accordingly penetrates deeply into gap 12 or to the point 14 of junction on surfaces 16 and 17 only at the line 19 of the joint. This type of laser beam 20 in the form of a gap-parallel streak, which is accordingly focused across gap 12, is an essential means of ensuring that the heating point at edges 10 and 11 coincides with the point 14 of junction.

The plane 22 of gap 12 is represented in FIG. 2b by a dot-and-dash line and in FIG. 1 by beam-boundary lines 23. The plane 22 of the gap accordingly becomes tangent to surfaces 16 and 17 only in the vicinity of the point 14 of junction.

Figure 6:
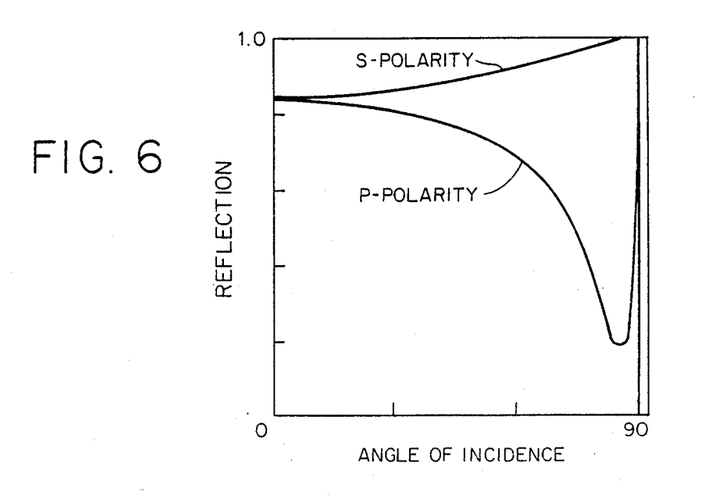
FIG. 6 shows how reflection depends on the angle of incidence.

It is important to the invention for the laser beam to be polarized only parallel to the plane 22 of the gap. It has been demonstrated that the reflectivity of beams generated by $CO_2$ lasers is polarization-dependent, especially in the case of high-quality steel. FIG. 6 illustrates the relationship. If the laser beam sweeps across the plane of the gap or is polarized parallel to the plane of incidence, the reflection will be reduced at wide angles of incidence. The absorption of the beam is accordingly comparatively powerful when a sweeping beam strikes in the form of streaks across the plane of the gap, and the energy of the beam will not arrive at the point of junction or in its vicinity. If, on the other hand, the laser beam sweeps parallel to the plane 22 of the gap, as represented by reference number 24 in FIG. 1, the reflection will be very high at a wide angle of incidence as compared with a laser beam that is sweeping perpendicular to the plane of the gap. Most of a beam that is sweeping parallel to the plane of the gap will, due to the low dependence of its reflection on the angle of incidence, accordingly arrive at the point 14 of junction or in its immediate vicinity, where the absorption will then occur.

As will be evident from FIG. 6, it is a particular advantage when the laser beam is polarized strictly parallel to the plane of the gap and laser beam 20 is simultaneously focused in the form of gap-parallel streaks across gap 12 as illustrated in FIG. 1. The angle of incidence 18 (FIG. 3) measured between laser beam 20 and the perpendicular to surfaces 16 and 17 will then be especially wide and the reflection especially small, and the energy of the beam will arrive all the way at the point 14 of junction.

In FIG. 1 the focusing mirror 21 that dictates the width of laser beam 20 is positioned in the plane 22 of the gap and perpendicular to the line 19 of the joint. The depth h of the beam is prescribed such that it will equal the depth s of the gap from focusing mirror 21. In FIGS. 2a and 2b a deflection mirror 25 and another focusing mirror 31 have been introduced into the path of the beam from focusing mirror 21. Deflection mirror 25 deflects laser beam 20 onto focusing mirror 31, which focuses it such that the depth of its beam only begins to equal the depth s of the gap at the point 14 of junction.

FIG. 13 illustrates a device that is extensively similar to that illustrated in FIG. 2. The depth of laser beam 20, however, is dimensioned such that it is somewhat greater than the depth s of the gap at the line 19 of the joint. The portion of laser beam 20 that passes beyond the line 19 of the joint strikes edge areas 26 at an acute angle that depends on the focus and accordingly melts them. Since the surfaces of these edge areas 26 are oriented perpendicular to the plane of the gap, the energy of the laser beam is to a large extent absorbed, especially when the beam is polarized parallel to the plane of the gap, because the angle of incidence between the beam and the perpendiculars to edge areas 26 is wide. The melting zones produced by laser beam 20 are represented by the heavy lines in FIG. 4, which illustrates laser beam 20 so clustered by focusing mirror 31 that it is as deep as the point 14 of junction in the vicinity thereof. Laser beams 27 and 28 are also reflected onto edge areas 26 by deflection mirrors 25 and 29. Instead of the laser beams 27 and 28 from another lower-powered laser, some of the energy of the laser that generates beam 20 can also be stopped out in a way that is not illustrated and can be employed as illustrated in FIG. 4.

Other sources of heat, high-frequency heat sources for example, can also be employed instead of laser beams 27 and 28.

Figure 3:
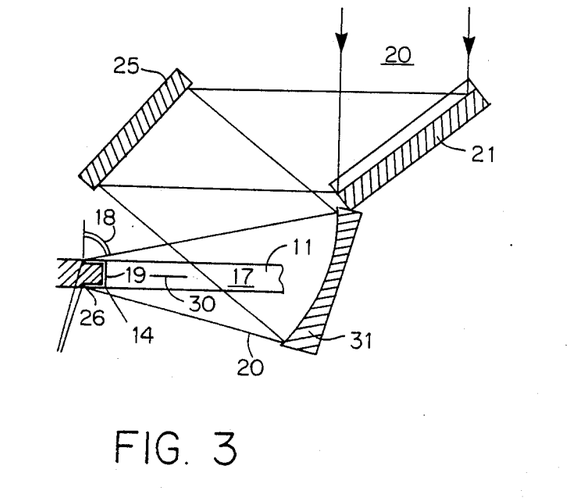
FIG. 3 shows a device wherein the laser beam encloses a perpendicular to the line of the gap.
Figure 4:
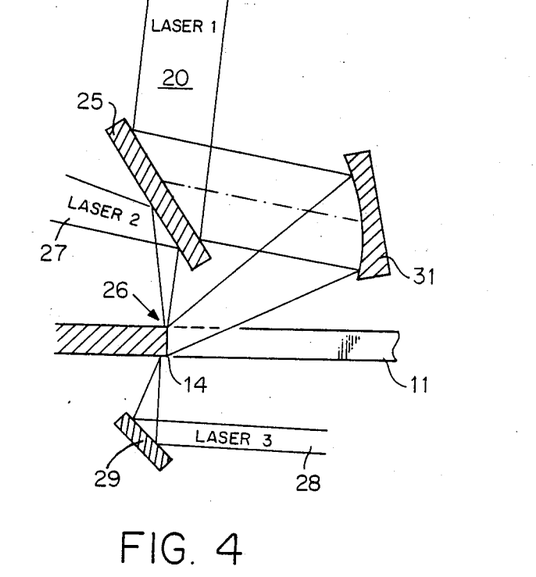
FIG. 4 shows a device with additional lasers.

FIG. 4 illustrates focusing mirror 31 above edges 10 and 11, which can be practical means of saving space. This arrangement, however, necessitates at least one additional laser beam if both edge areas 26 above and below edges 10 and 11, are to be heated. If, on the other hand, the mean perpendicular 30 to line 19 of the joint is to be included by laser beam 20 as illustrated in FIG. 3, a single laser beam 20 will be adequate.

Figure 5:
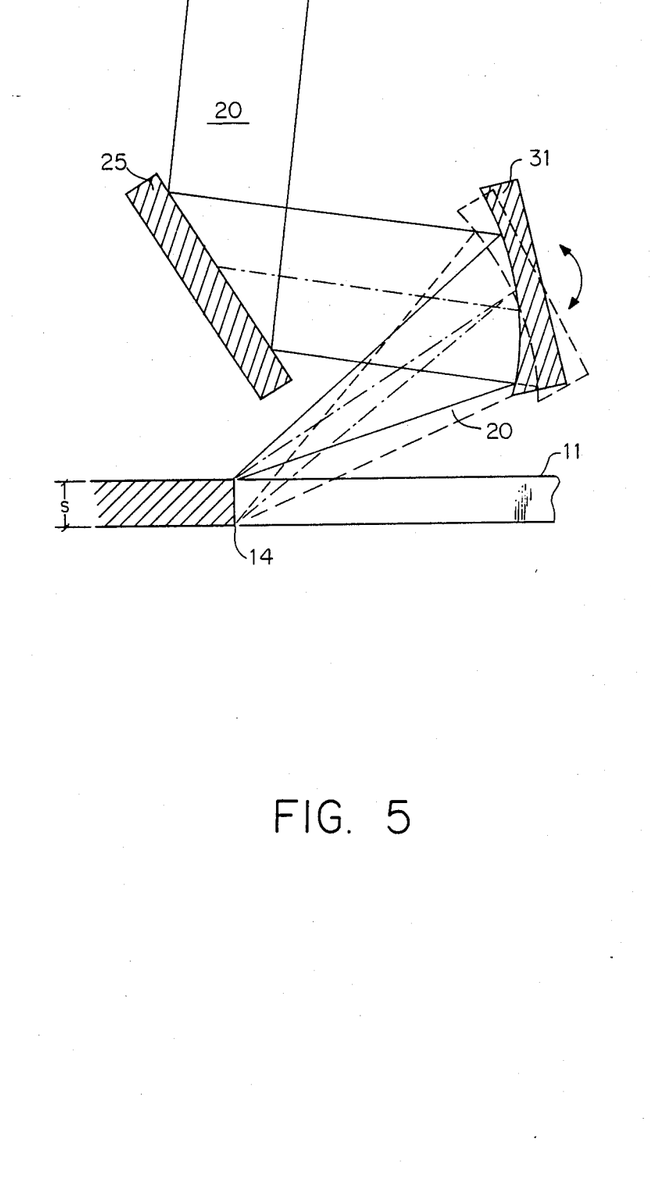
FIG. 5 shows a device with a moving focusing mirror.

FIG. 5 illustrates a device with a moving focusing mirror 31. Since the laser beam 20 supplied to focusing mirror 31 has already been focused perpendicular to the plane of projection, any additional focusing carried out by focusing mirror 31 in the vicinity of the point 14 of junction will yield a beam with a point-shaped cross-section that can be shifted back and forth over the depth s of the point 14 of junction. The result is a uniform distribution of energy over the depth s of the point 14 of junction.

Figure 7:
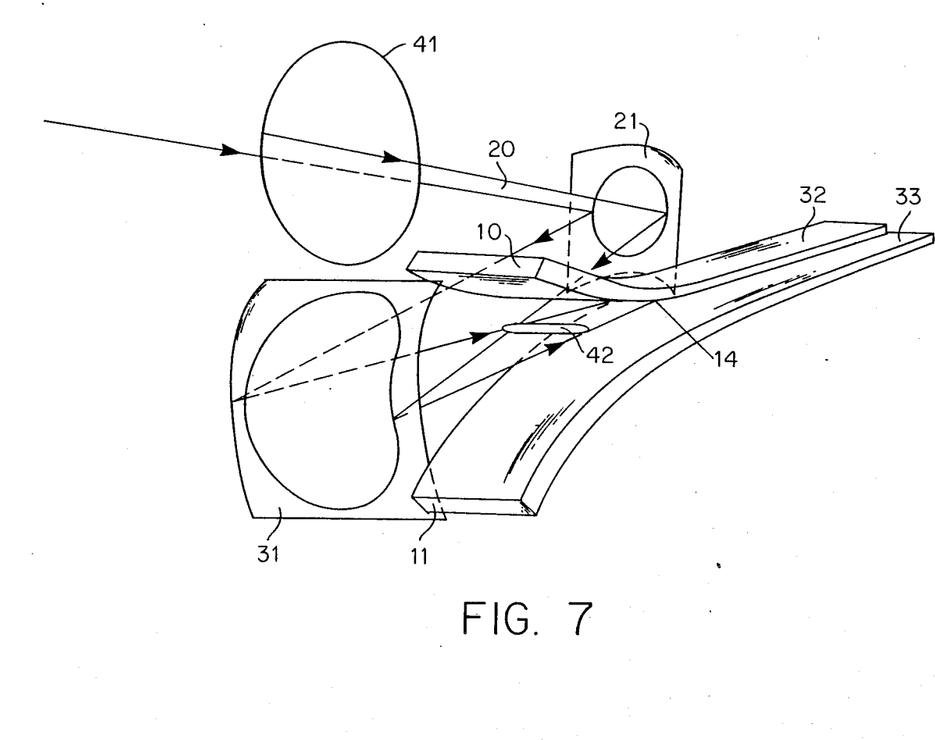
FIG. 7 is a schematic perspective view of a device for joining overlapping edges.

The edges 10 and 11 of the two parts 32 & 33 being bonded together in FIG. 7 are overlapping in that they are brought into tangential contact as previously described herein by unillustrated guides. The line of the joint or the point 14 of junction is accordingly horizontal in FIG. 7. Laser beam 20 has an initial cross-section 41 and is focused by a focusing mirror 21 onto the depth s of the gap and projected onto focusing mirror 31 as represented by cross-section 42.

Figure 8:
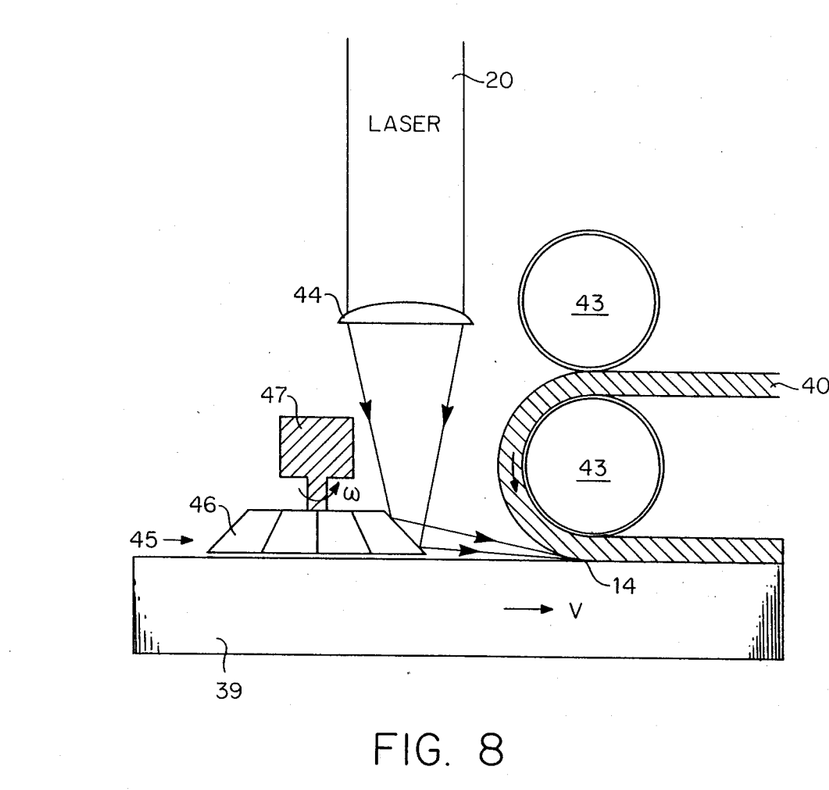
FIG. 8 is a schematic representation of a device for applying a coating to a base.

FIG. 8 illustrates two parts 39 and 40 being bonded together. Part 39 is a base, a sheet for example, being conveyed at a speed v and part 40 is a surfacing material, a welding foil for example. Part 40, the foil, is supplied and diverted in the direction indicated by the arrow and contacts part 39 tangentially at a point 14 of junction.

Parts 39 and 40 are bonded together by a laser beam 20, which is focused on the point 14 of junction by focusing optics 44. Laser beam 20 is deflected by a polygonal mirror 45 that consists of several segments 46 positioned at mutually equal angles and at an angle of 45° to the vertical at the outer circumference of a supporting wheel and that is rotated by a drive mechanism 47 at a prescribed angular velocity $\omega$. Laser beam 20 will accordingly always be moved perpendicular to the plane of projection from front to back and the spot that is focused on a fraction of the depth s of the gap will sweep several times over the point 14 of junction or the line of the joint in accordance with angular velocity $\omega$ and supply the energy necessary for welding. If the strips that constitute parts 39 and 40 are not too wide, a stationary planar deflecting mirror can be employed instead of polygonal mirror 45.

Figure 9:
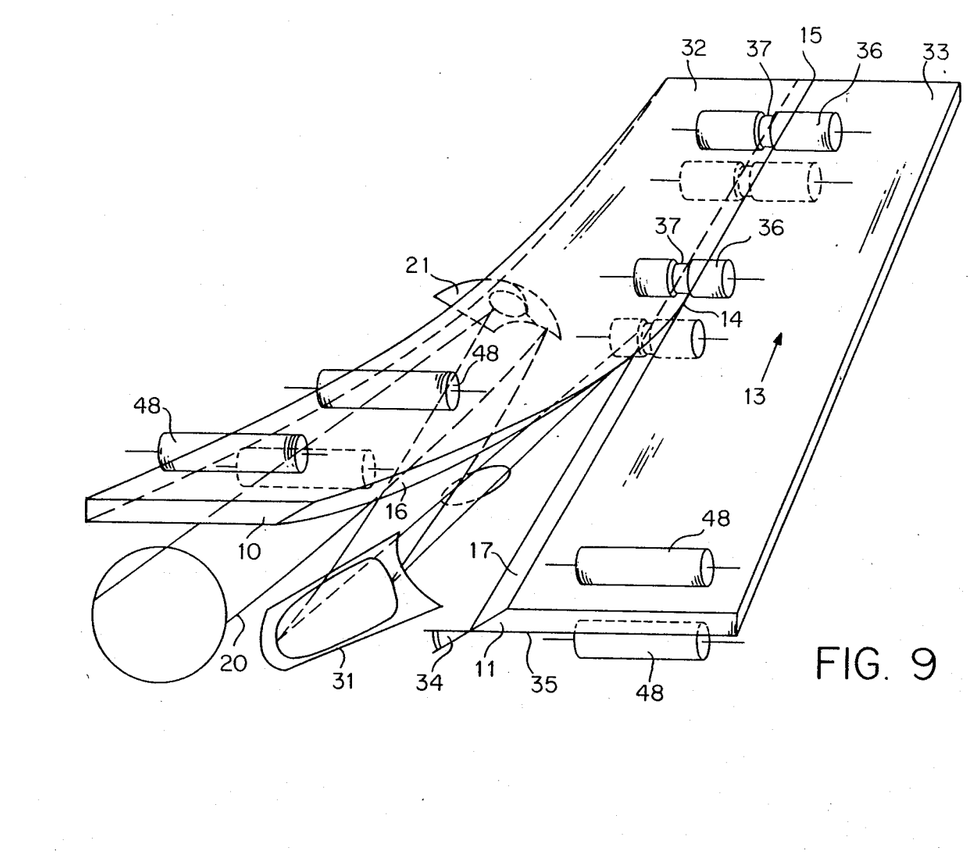
FIG. 9 is a schematic perspective view showing how the edges of plate are joined.

FIG. 9 illustrates two parts 32 and 33 being bonded together that consist of heavy sheet and that are brought together in a butt joint. It will be evident that these sheets, which are much wider than they are thick, cannot be brought together along their major plane as illustrated in FIG. 1 because they would deform unacceptably in that plane. They are accordingly sheared together as illustrated, specifically by means of positioning rollers 48 located above and below each part 32 and 33. Important to the joining of strips of material of this type is the use of angled bonding surfaces 16 and 17. Surfaces 16 and 17 are accordingly at an angle 34 that is not 90° to outer workpiece surface 35. The point 14 of junction is at a similar angle, and laser beam 20 must be appropriately angled by way of focusing mirrors 21 and 31 between surfaces 16 and 17.

Figure 10:
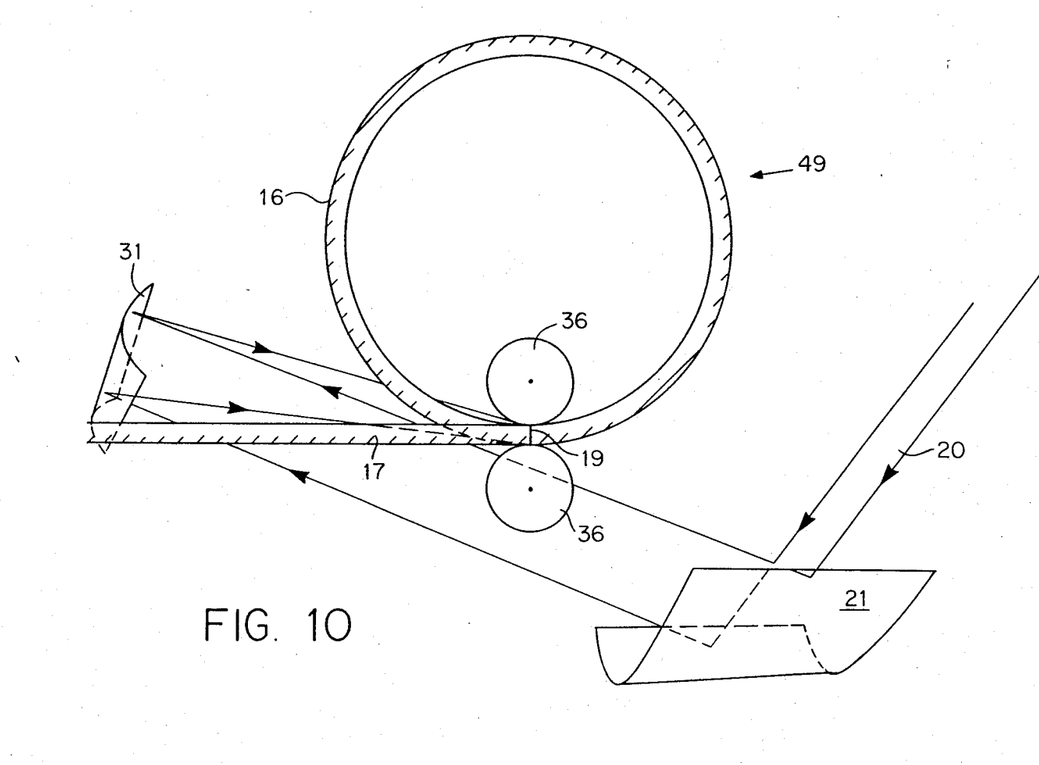
FIG. 10 is a side view of a device for welding coils of tubing.
Figure 11:
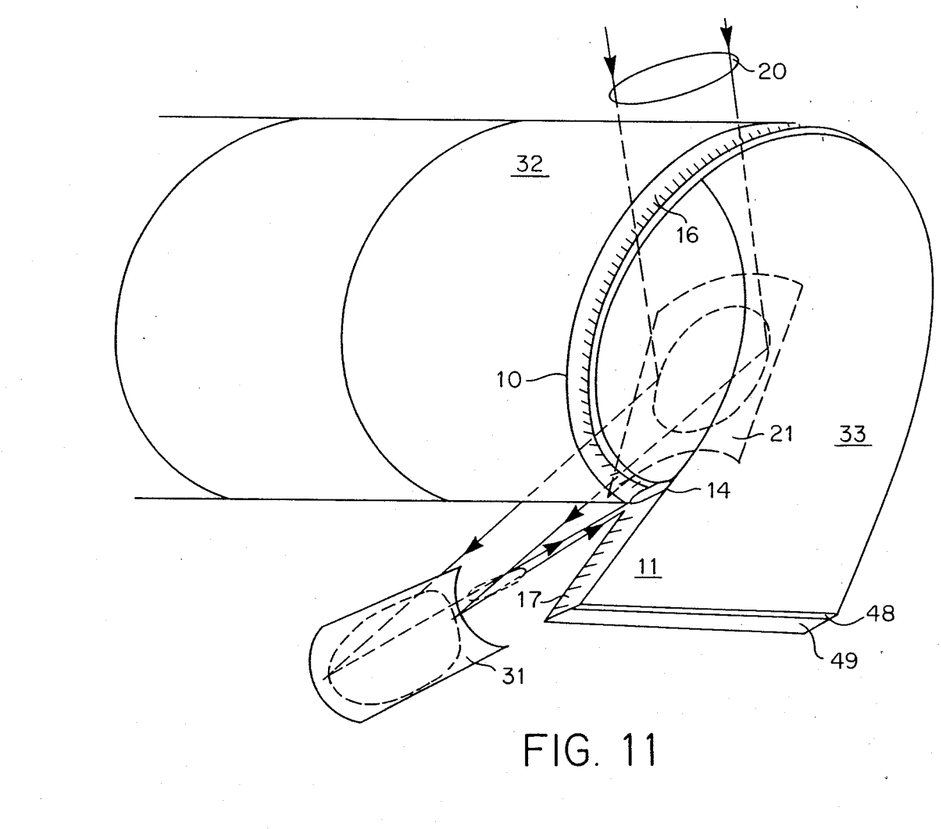
FIG. 11 is a perspective view that supplements

FIGS. 10 and 11 illustrate how coils 49 of tubing can be welded. A strip of material is wound into a coil in a known way with the edges 10 and 11 of parts 32 and 33, which consist of strips of material, sheared together into a butt joint at the point 14 of junction. Since, as will be particularly evident from FIG. 10, it is only directly in front of the line 19 of the joint that the surfaces 16 and 17 of edges 10 and 11 begin to overlap, it will be necessary, in order to reflect the beam in onto the line 19 of the joint, to angle surfaces 16 and 17 as illustrated in FIG. 11 so that they can reflect the incident beam far enough in front of the line 19 of the joint. Laser beam 20 is focused in the form of gap-parallel streaks across the joint gap by focusing mirrors 21 and 31, similarly to FIG. 9, and in particular polarized parallel to the plane of the joint gap.

FIGS. 9 through 11 illustrate how surfaces 16 and 17 can be positioned at the point 14 of junction without vertical offset by guides 36. Guides 36 are rollers or double rollers that accommodate between them and in the vicinity of welding seam 15 an annular groove 37 that leaves the seam free, although they may also be sliding shoes. The guides or rollers are not illustrated in FIG. 11. Any molten material that leaks out will accordingly not affect the positioning of parts 32 & 33. Parts 32 & 33, however, are not positioned only in the vicinity of the point 14 of junction but, as illustrated in FIG. 9, also behind it, so that welding seam 15 will be controlled as it cools, preventing stress as the result of weight-dependent tension on the strips of material. Parts 32 & 33 are in a practical way positioned without being subject to pressure in the vicinity of the point 14 of junction.

FIG. 11 supplements FIG. 10 and illustrates how the strips of material or parts 32 & 33 consist of two laminations 48 and 49, of which lamination 49 is a base and lamination 48 an anticorrosion coating for example. Surfaces 16 and 17 are welded together tight by laser beam 20 in such a way that lamination 48 will constitute a thick lining inside the pipe.

Figure 12A:
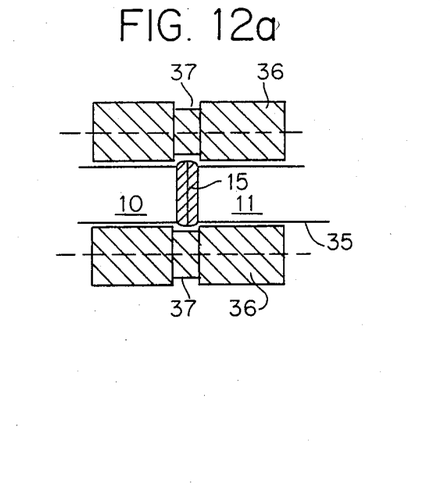
Figure 12B:
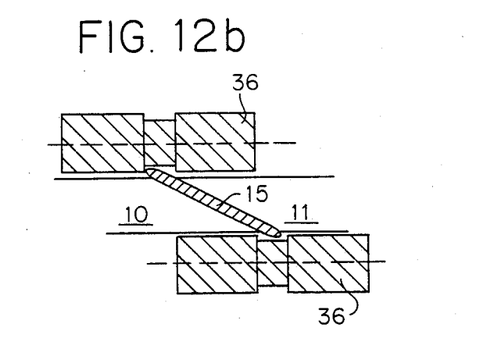
Figure 12C:
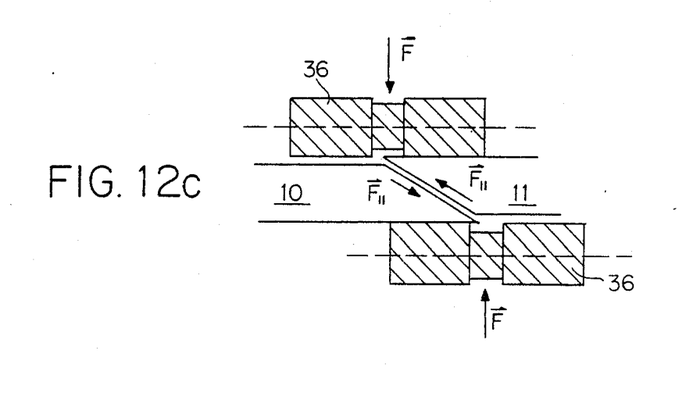
Figure 12D:
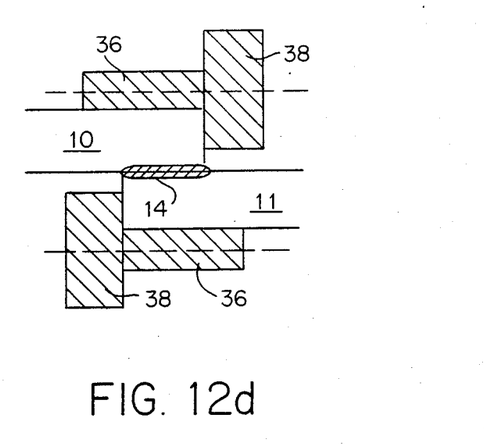
Figure 12E:
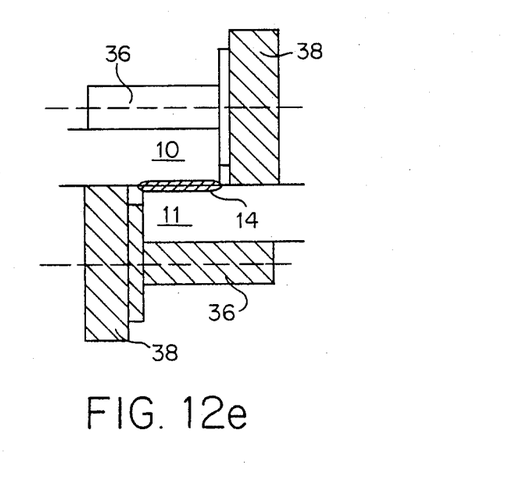

FIGS. 12a through 12e are sections illustrating how the parts being bonded together or their edges 10 and 11 can be positioned. FIG. 12e illustrates a butt joint positioned vertically in relation to the outer surface 35 of a workpiece by means of two roller-shaped guides 36, each of which has an annular groove 7 in the vicinity of welding seam 15. FIG. 12b illustrates a similar arrangement with mutually displaced rollers for positioning an angled butt seam 15. FIG. 12c illustrates the process of joining with guides 36 in the form of rollers. FIGS. 12d and 12e relate to overlapping edges with a correspondingly horizontal point 14 of junction. Edges 10 and 11 are secured against lateral displacement by guides 36, each of which has an annular collar 38. The annular collar 38 in FIG. 12e is as deep as the part or its edges 10 and 11 are thick, so that the edges cannot be forced together in the vicinity of the point 14 of junction but are as desired brought together without compression.

The annular groove 37 is deep or wide enough, and the annular collar 38 in FIG. 12d is far enough away from edge 11, to allow the processes occurring at the point 14 of junction to be monitored in terms of welding or bonding temperature.

The present specification and claims are of course intended solely as illustrative of one or more potential embodiments of the invention and should not be construed as limiting it in any way. The invention may accordingly be adapted and modified in many ways that may occur to one of skill in the art without deviating from the theory behind it or exceeding the scope of its application.

We claim:

1. An arrangement for producing a joint by a laser beam, particularly for welding edges, comprising: a joint gap to be welded and having a joint plane and a joint line; means for extending the laser beam substantially parallel to the plane of said joint and perpendicular to the line of said joint; said laser beam being polarized preponderantly parallel to the plane of the joint gap.

2. An arrangement as defined in claim 1, wherein said laser beam has a size differing substantially from the gap's depth at a point of junction.

3. An arrangement as defined in claim 2, wherein said laser beam encloses the mean perpendicular to the line of the joint.

4. An arrangement as defined in claim 1, including means for additionally heating a point of junction with at least one laser beam from at least one side of the gap.

5. An arrangement as defined in claim 1, including preliminary positioned-together parts at a point of junction; measuring means for constantly monitoring temperature of said preliminary positioned-together parts; control means for comparing temperature measurement with a reference temperature and regulating at least one operating parameter dependent on the comparison.

6. An arrangement as defined in claim 1, wherein said gap has a depth, said laser beam being shaped in form of a point or streak over a fraction of said depth and being repeatedly deflected over a part of said depth.

7. An arrangement as defined in claim 1, including parts to be bonded together have bonding surfaces positioned substantially free of vertical and lateral setbacks at a point of junction.

8. An arrangement as defined in claim 7, including parts to be bonded together in vicinity of a welding seam, and guides on each side of the gap between said parts to be bonded together, said guides acting on said welding seam and on said parts to be bonded together.

9. An arrangement as defined in claim 8, wherein said guides comprise roller means with an annular groove having a width that is at least as wide as the welding seam.

10. An arrangement as defined in claim 1, including parts to be bonded together and having bonding surfaces made substantially smooth at least in relation to irregularities that might deflect the beam.

11. An arrangement as defined in claim 1, including parts to be bonded together, at least one of said parts having at least two layers of different materials.

12. An arrangement as defined in claim 1, wherein said laser beam is focused with focal points in vicinity of a point of junction.

13. An arrangement as defined in claim 1, wherein said laser beam has a streak-shaped cross-section and is positioned at an angle to the plane of said gap.

14. A method for producing a joint by a laser beam, particularly for welding edges, comprising: providing two parts to be bonded together at a joint with a gap to be welded and having a joint plane and a joint line; extending the laser beam substantially parallel to the plane of said joint and perpendicular to the line of said joint; and polarizing said laser beam preponderantly parallel to the plane of the joint gap between said parts to be bonded together.

15. A method as defined in claim 14, wherein said joint is produced in an atmosphere free of plasma.

16. A method as defined in claim 14, including the step of heating said parts to be bonded together in vicinity of a point of junction, said heating being applied on both sides of the joint depending on bonding conditions.

17. A method as defined in claim 16, including the step of flooding the heated parts with a protective gas.

18. A method as defined in claim 14, wherein said laser beam is pulsed, pulses of said laser beam being increased to at least partly compensate for loss of intensity of the beam when the shape of a spot covered by the beam diverges from a circle.

19. A method as defined in claim 14, including the step of shearing an edge of one of said parts to be bonded together in a motion having a vertical component against an edge of the other one of said parts to be bonded together into a butt joint during one increment of advance.

20. A method as defined in claim 19, wherein said parts to be bonded together have surfaces comprising a point of junction and being oriented at an angle differing from 90° to one outer workpiece surface of said parts.

21. A method as defined in claim 14, wherein said parts to be bonded together have major surfaces and are comprised of laminar materials, said parts being joined together at said major surfaces.

22. A method as defined in claim 21, wherein at least one of said parts to be bonded together has at least two laminations comprised of different materials.

23. A method as defined in claim 22, wherein one of said parts is a coated part having at least one lamination, said lamination being bonded to the other one of said parts to be bonded together.

24. An arrangement as defined in claim 1, including means for focusing the laser beam across said gap in form of streaks that parallel said gap.

* * * * *